Feb. 24, 1970  L. A. WARNER  3,496,640
NAVIGATIONAL PLOTTER
Filed Feb. 23, 1968  2 Sheets-Sheet 1
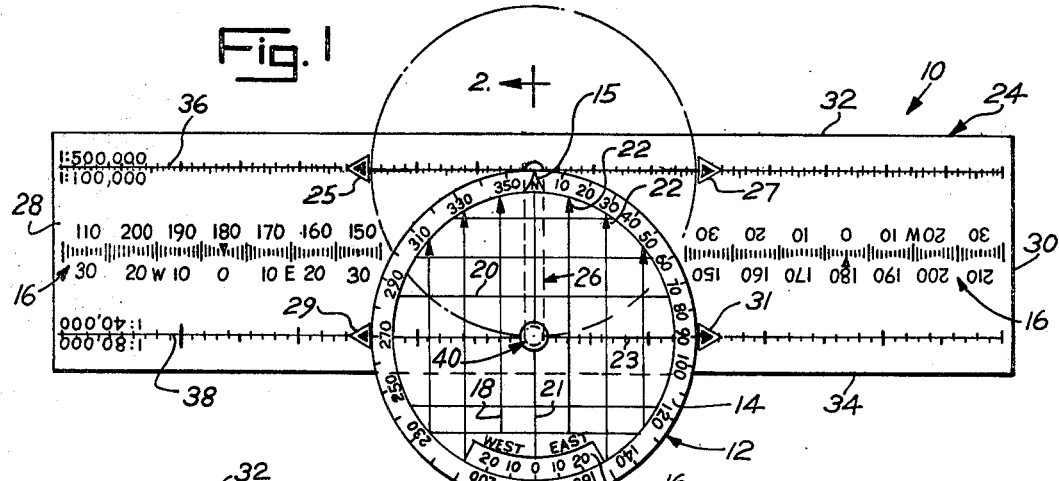
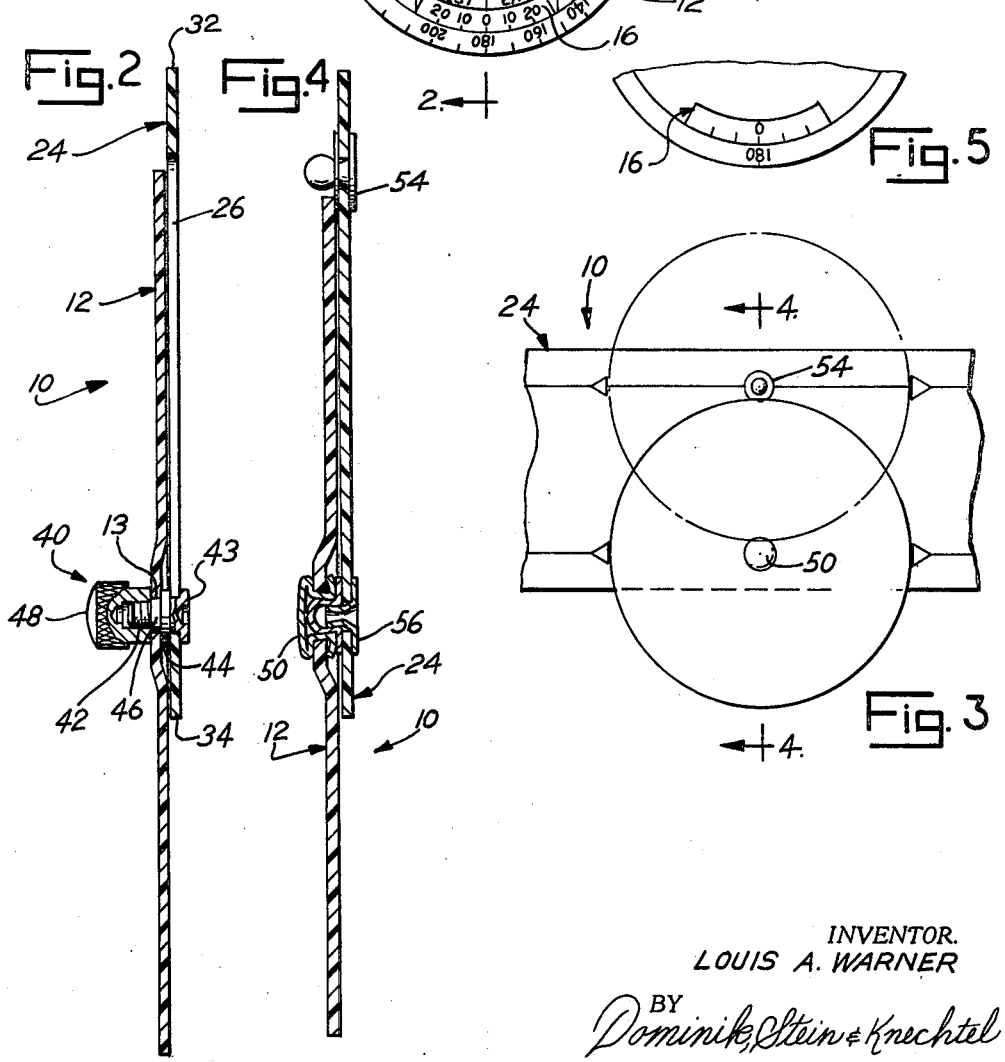
INVENTOR.
LOUIS A. WARNER
BY Dominik, Stein & Knechtel
ATTORNEYS Feb. 24, 1970  L. A. WARNER  3,496,640
NAVIGATIONAL PLOTTER
Filed Feb. 23, 1968  2 Sheets-Sheet 2
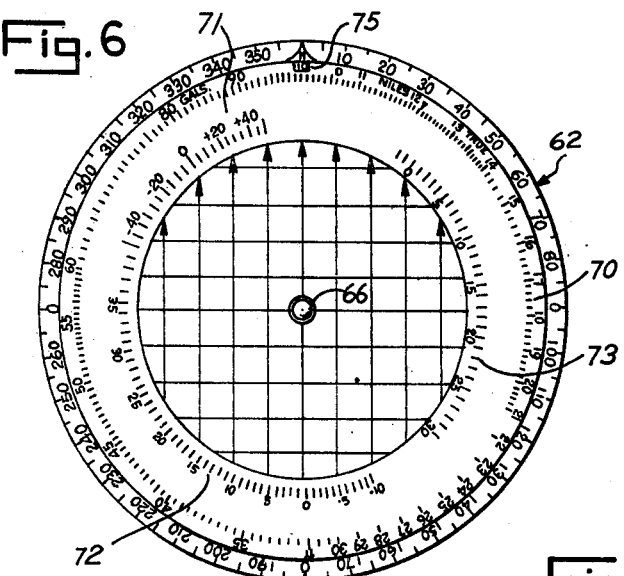
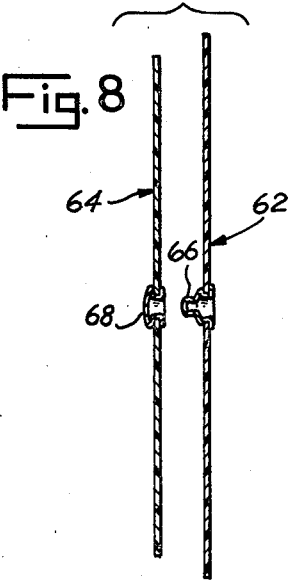
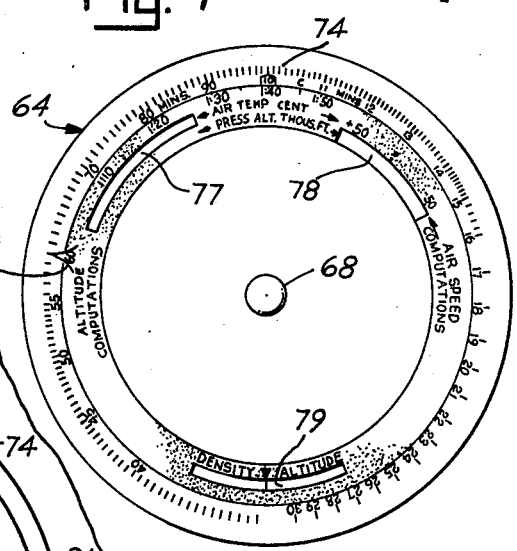
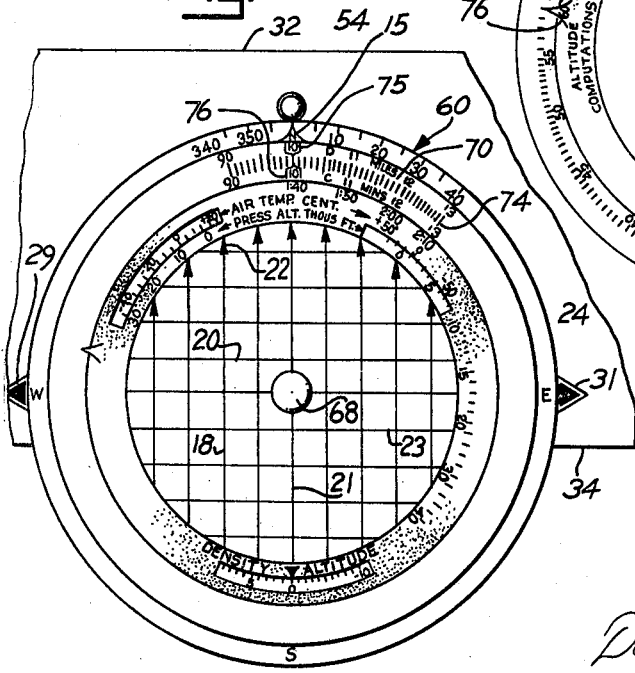
INVENTOR.
LOUIS A. WARNER
BY
Dominik, Stein & Knechtel
ATTORNEYS

United States Patent Office 3,496,640
Patented Feb. 24, 1970

3,496,640
NAVIGATIONAL PLOTTER
Louis A. Warner, 5223 N. Natoma,
Chicago, Ill. 60656
Filed Feb. 23, 1968, Ser. No. 707,741
Int. Cl. G01c 21/00, 21/20
U.S. Cl. 33—1                                    7 Claims

ABSTRACT OF THE DISCLOSURE

This invention relates to a navigational plotter including a rectangular-shaped straight-edge member having at least two parallel edges, adjacent to which are provided at least one air navigational scale and at least one marine navigational scale, respectively. A 360° circular-shaped compass rose member is adapted to be selectively positionably affixed to the straight-edge member in cooperative relationship with respective ones of the air and marine navigational scales and other indicia on the straight-edge member. The compass rose member further is adapted to have another circular-shaped disc removably affixed to it, so as to form a computer.

---

This invention relates, in general, to navigational plotters and, in particular, to navigational plotters which are applicable for both air and marine navigation to derive true courses and distances when used in conjunction with an appropriate chart.

Most navigational plotters are designed for only a single application, that is, for marine navigation or for air navigation, due to the fact that marine and air charts generally are scaled differently.

There are some navigational plotters available which are applicable for both marine and air navigation. For example, in United States Patent 3,280,464 there is disclosed a universal navigational plotter which includes a number of differently calibrated scales which can be removably affixed to the plotter. The disclosed plotter is extremely versatile since it can be adapted for use with virtually any marine or air chart, regardless of its calibration, simply by affixing an appropriately calibrated scale to it.

Another much cheaper and less versatile plotter is in the form of a generally rectangular-shaped member having a semicircular shaped compass rose member integrally formed with it, along one of its opposite edges. One side of the plotter is adapted for use on air navigational problems, while the opposite side thereof is adapted for use on marine navigational problems. The principal disadvantage of this plotter is that the scales and the indicia on the opposite sides thereof necessarily are separated from one another by means of opaquing on the plotter. This opaquing is objectionable since it obscures some of the detail of the chart, and this detail, in many cases, is of considerable importance. Furthermore, the compass rose member is generally difficult to read quickly and accurately.

Accordingly, it is an object of the present invention to provide improved navigational plotters which are applicable for both air and marine navigation to derive true courses and distances when used in conjunction with an appropriate chart.

Another object is to provide improved navigational plotters of the above type which are relatively simple in construction and inexpensive to manufacture.

Still another object is to provide improved navigational plotters of the above type having little opaquing thereon so that the chart detail is not obscured.

A still further object is to provide improved navigational plotters of the above type, wherein all of the scales are on the same side of it.

Still another object is to provide improved navigational plotters of the above type, wherein the air navigational scales and the marine navigational scales are provided thereon adjacent two opposite sides thereof, respectively, and wherein there is provided a compass rose member which is selectively positionably adjustable for use with each of the air and marine navigational scales, respectively.

Still another object is to provide improved navigational plotters of the above type, wherein the compass rose member further is adapted to have a circular-shaped disc removably affixed to it to form a computer.

Other objects of the invention will in part be obvious and will in part appear hereinafter.

The above objectives are accomplished with a navigational plotter including a rectangular-shaped straight-edge member having at least two parallel edges, adjacent to which are provided at least one air navigational scale and at least one marine navigational scale, respectively. A 360° circular-shaped compass rose member is adapted to be selectively positionably affixed to the straight-edge member in cooperative relationship with respective ones of the air and marine navigational scales and other indicia on the straight-edge member. Also, a circular-shaped disc is provided which can be removably affixed to the compass rose member to provide a computer.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a top plan view of a navigational plotter exemplary of the invention;

FIG. 2 is a sectional view of the plotter, taken along lines 2—2 of FIG. 1;

FIG. 3 is a partial top plan view of an alternative construction for the plotter of the invention;

FIG. 4 is a sectional view taken along lines 4—4 of FIG. 3;

FIG. 5 is a partial top plan view of the compass rose member, illustrating an alternative arrangement for the variation and deviation scale;

FIG. 6 is a top plan view of a compass rose member which is adapted to be removably affixed to the plotter and which is further adapted to have another disc member removably affixed to it to form a computer;

FIG. 7 is a top plan view of the disc member which is adapted to be removably affixed to the compass rose member of FIG. 6 to form a computer;

FIG. 8 is a sectional view of the compass rose member of FIG. 6 and the disc member of FIG. 7, illustrating the manner in which they are removably affixed together atop one another to form a computer which can be, in turn, removably affixed to the plotter; and FIG. 9 is a partial top plan view, illustrating the computer affixed to the plotter.

Similar reference characters refer to similar parts throughout the several views of the drawings.

Referring now to the drawings, in FIGS. 1 and 2 there is shown a navigational plotter 10 comprising a circular compass rose member 12 having a 360° compass rose 14 provided about its peripheral edge. An index 15 in the form of an arrowhead represents north, and of course, the 90th. 180th, and 270th calibrations thereof correspond to east, south and west, respectively. A pair of variation and deviation scales 16, each of which is like the other but reversed so that one or the other of them can be easily used, depending upon the orientation of the plotter 10, are provided on the face of the plotter. Alternatively, a single variation and deviation scale 16 can be provided on the compass rose member 12, adjacent the compass rose 14. In this case, the scale 16 is calibrated in degrees from 0 to 30 in both the east and the west directions, and is cooperatively related with the south or 180th calibration of the compass rose 14. The scales 16 are used to make mechanical adjustments of the compass rose member 12, to provide corrections for magnetic variation and deviation, in a manner explained more fully below. A number of grid lines 18 and 20, extending parallel to a line 21 between the zero and the 180th calibration and a line 23 between the 90th and 270th calibration, respectively, form a rectangular grid on the face of the compass rose member 12, for orienting the compass rose member to true north. Each of the north-south grid lines 18 has an arrowhead 22 on its one end to clearly indicate the proper true north heading.

The compass rose member 12 is rotatably and slidably affixed within a transversely extending slot 26 formed in a rectangular member 24, centrally between its two opposite ends 28 and 30. The rectangular member 24 also has two parallel longitudinal upper and lower straight edges 32 and 34, respectively. Adjacent each of the straight edges 32 and 34 is a distance scale 36 and 38, respectively, one of which (the distance scale 36 as illustrated) is calibrated to an air chart and the other one, distance scale 38, is calibrated to a marine chart. Also, as illustrated, the distance scale 36 includes two scales calibrated 1:500,000 and 1:1,000,000, and the distance scale 38 includes two scales calibrated 1:40,000 and 1:80,000, however, it is apparent that differently calibrated scales corresponding to the scale of other air or marine charts can be provided. Heading indicia 25, 27 and 29, 31 are provided on the rectangular member 24 in cooperative alignment with the compass rose member 12 and are used in conjunction with the latter, in a manner and for reasons set forth more fully below.

The compass rose member 12 is rotatably and slidably affixed to the rectangular member 24, by means of a thumb-screw fastener 40 (FIG. 2). The fastener 40 includes a threaded screw 42 which has a diameter corresponding to the width of the slot 26 and an enlarged flat head 43 which spans the width of the slot 26. The threaded screw 42 is extended through the slot 26 and has a washer 44 placed on it which likewise has a large diameter so as to span the width of the slot. Another washer 46 which is slightly thicker than the thickness of the compass rose member 12 and which has a diameter corresponding to that of the aperture 13 formed in the compass rose member next is placed atop the washer 44. The compass rose member 12 then is placed atop the washer 44, with the washer 46 disposed within its aperture 13, and secured to the plotter 10 by means of a cap 48 which is threaded to receive the screw 42 therein. With this arrangement, when the cap 48 is tightened, it forcibly bears against the washer 46 which, in turn, bears on the washer 44 so that the compass rose member 12 is fixedly secured to the plotter 10. However, since the thickness of the washer 46 is greater than that of the compass rose member, the latter is free to rotate about the washer 46.

The compass rose member 12, the recangular member 24 and the slot 26 all are proportioned so that the straight edges 32 and 34 are not obstructed and can be used to draw a course line between two points whenever the compass rose member 12 is slidably adjustably positioned at one or the other of the two extreme opposite ends of the slot 26. Also, when the compass rose member 12 is moved so that the threaded screw 42 engages one or the other of the opposite ends of the slot 26, the compass rose member 12 is positioned in cooperative relationship with the heading indicia 25, 27 or 29, 31 on the plotter 10.

In FIGS. 3 and 4, the plotter 10 is shown having a pair of snaps 54 and 56 which comprise one-half of a snap fastener fixedly secured to it, in a spaced, aligned relationship, generally corresponding to those of the extreme opposite ends of the slot 26 of the plotter of FIGS. 1 and 2. The slot 26, in this case, of course, is eliminated. The compass rose member 12 also is modified and includes a button fastener 50 which comprises the other cooperative half of the snap fastener fixedly secured to it. Otherwise, the plotters of FIGS. 1 and 2, and FIGS. 3 and 4 are the same.

With the plotter of FIGS. 3 and 4, the compass rose member 12 is adjustably, positionably affixed to the plotter 10 in cooperative alignment with the distance scales 36 and 38 and the heading indicia 25 and 27 thereon, by snapping the compass rose member 12 on the appropriate one of the snaps 54 and 56.

From the above description of the plotter 10, it can be seen that the plotter is easily and quickly adapted for either air or marine navigation, simply by adjustably positioning the compass rose member 12 in cooperative relationship with the distance scale 36 or the distance scale 38. In the case of the plotter of FIGS. 1 and 2, this is accomplished by loosening the cap 48 and then sliding the compass rose member 12 and hence the threaded screw 42 until the latter engages one of the opposite extreme edges of the slot 26. The cap 48 is then tightened to fixedly secure the compass rose member to the plotter 10. In the case of the plotter of FIGS. 3 and 4, the compass rose member 12 is removably affixed to the appropriate one of the snaps 56 and 54. by means of the button fastener 50 affixed to it.

With the compass rose member 12 properly positionably affixed to the plotter 10, the plotter is placed on a chart, with its upper or lower straight edge 32 or 34 aligned between the two points on the chart being traveled. The zero calibration is, of course, placed over the first point so that the distance between the two points may be read on the distance scale 36, or 38, over the second point. As indicated above, the compass rose member 12, the rectangular member 24 and the slot 26, or snaps 54 and 56, all are proportioned so that the straight edges 32 and 34 are not obstructed, regardless of the position of the compass rose member 12. Accordingly, the straight edge having the distance scale thereon which corresponds to the chart being used for navigation always is available to draw a straight line between the two points being traveled.

With the rectangular member 24 positioned as described above, and held fixed, the compass rose member 12 is rotated so that all of the grid lines 18 having the arrowhead thereon point to true north. With the plotter 10, this is easily accomplished by merely orienting any one of the grid lines 18 over, or in parallel relation with, a meridian line on the chart. The true course is now indicated on the compass rose 14, over the heading indicia 25 or 27, or 29 or 31, on the rectangular member 24, depending upon the distance scale being used and the direction of travel.

To determine the correct magnetic course, the plotter 10 is positioned to read the true course, in the manner described above, and a mark is placed on the chart under the south reference, or 180th calibration, of the compass rose 14. The magnetic variation is determined from the magnetic rose, or from the isogonic line, on the chart and this variation value is applied to the appropriate one of the variation and deviation scales 16 on the rectangular member 24. Thereafter, the value read on the scale 16 is applied to the compass rose member 12, by rotating it until the corresponding value is aligned with the mark placed on the chart. The magnetic course is then read over the heading indicia, in the same manner as described above. For example, if the magnetic variation is 12° east, this value is applied to the scale 16 and above this value is read 168°. The compass rose member 12 then is rotated to align the 168th calibration of the compass rose 14 with the mark placed on the chart. The magnetic course is now indicated and read, over the heading indicia 29, or 31.

If the variation and deviation scale 16 is provided on the compass rose member 12, the magnetic course is determined as follows. The plotter 10 is positioned to read the true course, in the manner described above, and a mark is placed on the chart under the south reference, or 180th calibration. The magnetic variation is determined, and this variation value is automatically compensated for by rotating the compass rose member 12 to align the calibration on the scale 16 which corresponds to the variation value opposite the mark placed on the chart. The magnetic course is then read over the heading indicia, in the same manner as described above.

Magnetic deviation can be corretced in the same manner. Furthermore, magnetic variation and deviation can both be corrected in one continuous manipulation.

From the above description, it can be seen that the plotter 10 can be easily and quickly adapted for both air and marine navigation. Also, it has most of the features and advantages of the universal navigational plotter described in the above-identified United States patent; however, it is considerably less expensive to manufacture. Opaquing can be provided under the distance scales 36 and 38 to highlight them, if desired. However, since the distance scales only appear on one side of the plotter 10, these scales can be highlighted and/or color-coded merely by providing a transparent coloring beneath them. The same is true with respect to the heading indicia 25, 27, 29 and 31. Also, while the plotter 10 is illustrated having distance scales thereon corresponding to the calibration of an air chart and a marine chart, it is apparent that the distance scales adjacent each of the straight edges 32 and 34 can be calibrated so as to provide two or more distance scales which are usable with differently scaled air charts, or marine charts. When constructed in this fashion, the plotter 10 substantially eliminates the possibility of inadvertently using the wrong distance scale since the compass rose member 12, when properly positioned, obstructs the straight edge and hence the distance scale so that the user automatically is required to apply the proper distance scale to the chart. This feature, in itself provides a substantial improvement over most presently available single purpose plotters.

Referring now to FIGS. 6–9, in FIG. 9 there is illustrated a computer 60 which can be removably affixed to the rectangular member 24 of the plotter 10 so that the latter can be used in the manner described above, or which can be used independently of the plotter 10 to solve other types of navigational problems. The computer 60 can be formed of a compass rose member 62 (FIG. 6) and a disc member 64 (FIG. 7) which are fixedly and rotatably secured together and are adapted to be removably affixed to the rectangular member 24. Or, alternatively, the compass rose member 62 and the disc member 64 can be adapted to be removably affixed to one another to form the computer, and to be removably affixed to the rectangular member 24, as illustrated. When constructed in this last described manner, the compass rose member 62 can be selectively affixed to the snap fasteners 54 and 56 on the rectangular member 24 to form a plotter 10 which can be used in the above-described manner. If it is desired to have a computer affixed to the plotter 10, the disc member 64 can be affixed to the compass rose member 62 to form the computer 60 of FIG. 9. Also, the computer 60 can be detached from the plotter 10 and used independently, if desired. It can therefore be seen that the plotter 10 is extremely versatile.

More specifically, the computer 60 is formed of a compass rose member 62 which is generally like the compass rose member 12, but it in addition has miles and gallons scale 70 and scales 71, 72 and 73 which are used for density altitude computations.

The disc members 64, as can be best seen in FIG. 7, has a minutes scale 74 provided about its peripheral edge, which scale 74 coperates with the miles and gallons scale 70 on the compass rose member 62. The miles and gallons scale 70 and the minutes scale 74 have indexes 75 and 76, respectively, and generally correspond to the D and C scale on a conventional slide rule. In this case, however, these scales are numbered from 10 to 100 to fit air navigational solutions. The disc member 64 also has windows 77, 78 and 79 as well as additional indicia associated with these windows, all of which are cooperatively related to the scales 71–73 on the compass rose member 62 to solve density altitude computations. The computer 60 can be used in the well-known manner to solve time, speed and distance problems and density altitude problems.

As indicated above, the compass rose member 62 can have a fastener 66 fixedly secured to it, for selectively affixing the computer 60 to one or the other of the snap fasteners 54 and 56 on the rectangular member 24. Alternatively, the fastener 66 can be adapted to receive a button fastener 68 fixedly secured to the disc member 64 to removably secure the latter to the compass rose member 12 to form the computer 60, so that the compass rose member 12 and the computer 60 can be selectively affixed to the plotter 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Now that the invention has been described, what is claimed as new and desired to be secured by Letters Patent is:

1. A navigational plotter comprising, in combination: a circular-shaped compass rose member having a 360° compass rose thereon; and a rectangular member having parallel opposite edges forming straight edges, at least one distance scale provided adjacent each of said straight edges, heading indicia associated with each of said distance scales; pivot means associated with each of said distance scales; said compass rose member being transversely adjustably affixed to said rectangular member so as to rotate about a selected one of said pivot means in cooperative alignment with one of said distance scales and its associate heading indicia, said compass rose member and said rectangular member further being proportioned so that one of said straight edges is unobstructed by said compass rose member when the latter is positioned to rotate about the pivot point associated with the distance scale adjacent the opposite one of said straight edges.

2. The navigational plotter of claim 1, wherein said rectangular member has a slot extending transversely across its width, and wherein said compass rose member is adjustably affixed thereto with fastened means slidably disposed within said slot, said slot being proportioned such that said compass rose member is cooperatively aligned with one of said distance scales and its associated heading indicia when said fastener means engages the opposite extreme ends of said slot, respectively, 3. The navigational plotter of claim 1, wherein said rectangular member has one-half of a snap fastener affixed thereto in spaced relation and said compass rose member has the other cooperative one-half of a snap fastener affixed thereto, said compass rose member being positionably affixed to said rectangular member in cooperative relation with a selected one of said distance scales and its associated heading indicia by snap fastening said compass rose member to the appropriate one of said one-half of said snap fastener affixed to said rectangular member.

4. The navigational plotter of claim 1, wherein said distance scales adjacent said straight edges are calibrated for air navigation and for marine navigation, respectively.

5. The navigational plotter of claim 1, wherein said compass rose member has a disc member affixed to it, said compass rose member and said disc member having one of a miles and gallons scale and a minutes scale, respectively, provided on them in cooperative relationship so as to form a computer for solving time, speed and distance navigational problems.

6. The navigational plotter of claim 5 wherein said disc member is removably affixed to said compass rose member.

7. A navigational plotter comprising, in combination: a circular-shaped compass rose member having a 360° compass rose thereon; and a rectangular member having parallel opposite edges forming straight edges, at least one distance scale provided adjacent one of said straight edges, heading indicia adjacent each of said straight edges; pivot means in line with each of said heading indicia, said compass rose member being transversely adjustably affixed to said rectangular member so as to rotate about a selected one of said pivot means in cooperative alignment with said distance scale and one of its associate heading indicia, said compass rose member and said rectangular member further being proportioned so that one of said straight edges is unobstructed by said compass rose member when the latter is positioned to rotate about the pivot point associated with the heading indicia adjacent the opposite one of said straight edges.

References Cited

UNITED STATES PATENTS

| | | | |
|---|---|---|---|
| 1,495,805 | 5/1924 | Rooney | 235—88 X |
| 2,506,299 | 5/1950 | Isom. | |
| 2,545,935 | 3/1951 | Warner. | |
| 2,857,674 | 10/1958 | Feldhake. | |
| 3,365,818 | 1/1968 | Greiner | 235—88 X |

FOREIGN PATENTS

| | | |
|---|---|---|
| 599,260 | 3/1948 | Great Britain. |

WILLIAM D. MARTIN, Jr., Primary Examiner

U.S. Cl. X.R.

33—75; 235—88